United States Patent
Ma et al.

(10) Patent No.: US 8,571,384 B2
(45) Date of Patent: Oct. 29, 2013

(54) DIGITAL VIDEO RECORDER, DIGITAL VIDEO SYSTEM, AND VIDEO PLAYBACK METHOD THEREOF

(75) Inventors: Chen Ma, San Jose, CA (US); Yuan-Tao Wu, Santa Clara, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 1436 days.

(21) Appl. No.: 12/043,969

(22) Filed: Mar. 7, 2008

(65) Prior Publication Data
US 2008/0229373 A1      Sep. 18, 2008

Related U.S. Application Data

(60) Provisional application No. 60/895,148, filed on Mar. 16, 2007.

(51) Int. Cl.
*H04N 9/80* (2006.01)
(52) U.S. Cl.
USPC ............................................ 386/248; 725/92
(58) Field of Classification Search
USPC ......... 386/241, 248, 252, 327, 350, 351, 355, 386/356; 725/92
See application file for complete search history.

(56) References Cited

U.S. PATENT DOCUMENTS

| | | | | |
|---|---|---|---|---|
| 6,937,814 B1 * | 8/2005 | Chasen | | 386/235 |
| 7,450,822 B2 * | 11/2008 | Yoshida et al. | | 386/326 |
| 2003/0016944 A1 * | 1/2003 | Kato | | 386/46 |
| 2003/0233929 A1 | 12/2003 | Agnihotri | | |
| 2004/0010524 A1 * | 1/2004 | Wallace et al. | | 707/205 |
| 2004/0040041 A1 | 2/2004 | Crawford | | |
| 2004/0184531 A1 | 9/2004 | Lim | | |
| 2005/0019005 A1 | 1/2005 | Kim | | |
| 2005/0069283 A1 * | 3/2005 | Mitsuyu | | 386/46 |
| 2005/0163464 A1 | 7/2005 | Boyle | | |
| 2005/0192982 A1 | 9/2005 | Takahashi | | |
| 2005/0198570 A1 | 9/2005 | Otsuka | | |
| 2005/0203927 A1 | 9/2005 | Sull | | |
| 2006/0024026 A1 * | 2/2006 | Yamashita et al. | | 386/83 |
| 2006/0064602 A1 * | 3/2006 | Uittenbogaard | | 713/193 |
| 2006/0190549 A1 | 8/2006 | Teramae | | |
| 2006/0257103 A1 | 11/2006 | Lim | | |
| 2007/0061370 A1 | 3/2007 | Ferren | | |
| 2007/0098085 A1 | 5/2007 | Shih | | |
| 2007/0132852 A1 | 6/2007 | Yu | | |
| 2007/0253682 A1 * | 11/2007 | Chang et al. | | 386/125 |
| 2008/0016196 A1 | 1/2008 | MacMillan | | |

FOREIGN PATENT DOCUMENTS

| | | | |
|---|---|---|---|
| CN | 1411275 A | 4/2003 | |
| CN | 1863292 A | 11/2006 | |

(Continued)

*Primary Examiner* — Michael S McNally
(74) *Attorney, Agent, or Firm* — McClure, Qualey & Rodack, LLP (57) ABSTRACT

Disclosed is a digital recording apparatus, which includes: a storage device; a processing circuit, coupled to the storage device, for receiving a video signal and storing the video signal to the storage device in the form of a plurality of video files, and for generating an index data structure comprising a plurality of entries corresponding to the video files respectively; and a displaying device, coupled to the processing circuit, for displaying a video concept of the video files; wherein the processing circuit searches and compares the index data structure according to a time counting value when displaying the video concept to determine a first video file to be read of the video files and a first location of the first video file.

22 Claims, 6 Drawing Sheets

(56) References Cited

FOREIGN PATENT DOCUMENTS

| TW | 575807 | 2/2004 |
| TW | 200421871 | 10/2004 |
| TW | I234403 | 6/2005 |
| TW | M286528 | 1/2006 |
| TW | M286531 | 1/2006 |
| TW | M299987 | 10/2006 |

* cited by examiner

| File name | |
|---|---|
| Video. 001 | 2G byte |
| Video. 002 | 1G byte |
| Video. 003 | 0.5G byte |
| Video. 004 | 2G byte |
| Video. 005 | 1G byte |

| | File name | File size | Accumulated file size |
|---|---|---|---|
| First entry | Video. 001 | 2G byte | 2G byte |
| Second entry | Video. 002 | 1G byte | 3G byte |
| Third entry | Video. 003 | 0.5G byte | 3.5G byte |
| Forth entry | Video. 004 | 2G byte | 5.5G byte |
| Fifth entry | Video. 005 | 1G byte | 6.5G byte |

DIGITAL VIDEO RECORDER, DIGITAL VIDEO SYSTEM, AND VIDEO PLAYBACK METHOD THEREOF

CROSS REFERENCE TO RELATED APPLICATIONS

This application claims the benefit of U.S. Provisional Application No. 60/895,148, filed on Mar. 16, 2007 and entitled "DIGITAL VIDEO RECORDER, DIGITAL VIDEO SYSTEM, AND VIDEO PLAYBACK METHOD THEREOF", the contents of which are incorporated herein by reference.

BACKGROUND OF THE INVENTION

1. Field of the Invention

The present invention relates to a digital recording technique, and more particularly, relates to an image displaying method applied to a digital recording apparatus.

2. Description of the Prior Art

In a personal computer or other systems for processing and storing digital data, a file system is used for arranging the storage space and managing the access thereof. For example, FAT32 (File Allocation Table 32-bit version), NTFS (New Technology File System) are popular file systems standards. The FAT32 file system standard, however, has a 4 gigabyte (Gbyte) limitation on its file sizes. Since computer files or other information products have seldom exceeded this 4 Gbyte restriction in the past, such a limitation has caused little disturbance for file storage and reading.

Nowadays, however, electronic products have greater processing and computing abilities corresponding to improvements in semiconductor technology, and thus the cost of storage space is decreasing while various kinds of electronic apparatus are increasingly able to store and process large amounts of data. This phenomenon is most apparent in the field of multimedia audiovisual applications. For example, image definition standards have improved from standard definition (SD) to high definition (HD). For hardware, novel apparatus including digital televisions, set top boxes (STB), and digital video recorder (DVR) help to provide high-quality audiovisual enjoyment and convenience for the user. Since the amount of audiovisual data in current and future multimedia audiovisual trends will create files greater than tens of gigabytes in size, the current FAT32 file size limitation will cause inconvenience in managing files, creating displeasure in the enjoyment of this audiovisual content. To work around this, audiovisual information belonging to the same content (for example, a movie) must be separated into several files and stored, therefore making the managing and reading of such files inconvenient. The same situation will occur while applying image compression techniques or other multimedia audiovisual processing techniques; for example, compressed files generated by the DivX encoding technique have a limitation of 1 Gbyte, resulting in the same problem as mentioned above.

Consider a digital video apparatus such as a digital recorder, an STB or a digital TV with integrated digital recording and displaying functions. If such an apparatus is to display pre-recorded or downloaded image files belonging to the same content (for example, a movie), it must determine the next file according to the filename order and display the next file after the current file is finished. Such a method does not classify the files as belonging to a particular content, so if a file that does not belong to this same content exists, such a method cannot distinguish the "isolated" file, and the file will still be displayed.

Also, if a seek operation is desired to be performed on the content (for example, reviewing and searching within a movie), the seeking range can only comprise the current displayed file's range and the cross-file seeking cannot be performed. In addition, the unavoidable stop and delay while ending the previous file and starting the next file is a major factor in worsening the user experience.

SUMMARY OF THE INVENTION

Therefore, one objective of the present invention is to provide a digital video apparatus and a video displaying method thereof, which records related information of a plurality of files of the same content for displaying images smoothly.

One embodiment of the present invention discloses a digital recording apparatus, which comprises: a storage device; a processing circuit, coupled to the storage device, for receiving a video signal and storing the video signal to the storage device in the form of a plurality of video files, and for generating an index data structure comprising a plurality of entries corresponding to the video files respectively; and a displaying device, coupled to the processing circuit, for displaying a video content of the video files; wherein the processing circuit searches and compares the index data structure according to a time counting value when displaying the video content to determine a first video file to be read of the video files and a first location of the first video file.

Another embodiment of the present invention discloses a digital video system, which comprises: a storage device; a first logic, coupled to the storage device, for maintaining an index data structure comprising a plurality of entries corresponding to respective video files; and a displaying device, coupled to the first logic, for receiving and displaying a video content of the video files from the first logic; wherein the first logic searches and compares the index data structure according to a time counting value when displaying the video content, to determine a first video file and a first location of the first video file to be read.

Another embodiment of the present invention discloses an video displaying method, which comprises: generating an index data structure comprising a plurality of entries corresponding to respective video files; maintaining a time counting value corresponding to a video content to be displayed; searching and comparing the index data structure according to the time counting value to determine a first video file and a first location of the first video file to be read; and reading the first location of the first video file to display the video content.

These and other objectives of the present invention will no doubt become obvious to those of ordinary skill in the art after reading the following detailed description of the preferred embodiment that is illustrated in the various figures and drawings.

DETAILED DESCRIPTION

A digital recorder and/or a main device containing a DVR controller chip are examples for describing the embodiments of the present invention in the following description. They are not, however, intended to be limitations of the present invention. As known by persons skilled in the art, the method according to the present invention can be applied to other digital video apparatus, including recording/displaying functions or the above-mentioned DVR controller chip. For example, a digital set-top box, a digital television, or a game player also fall within the scope of the present invention.

Figure 1:
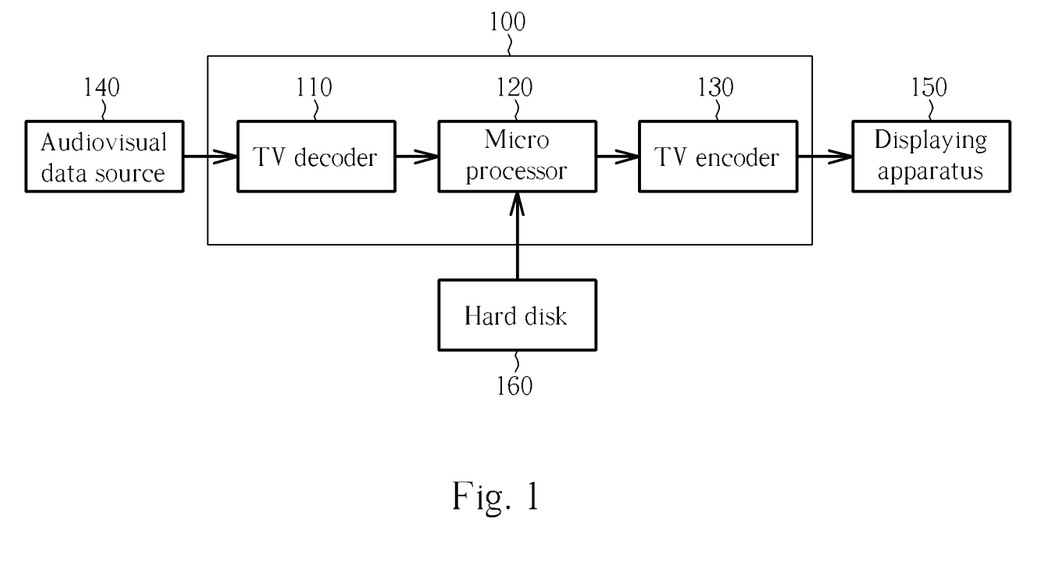
FIG. 1 is a diagram illustrating a digital video apparatus according to one embodiment of the present invention.

FIG. 1 is a diagram illustrating a digital video apparatus according to one embodiment of the present invention. As shown in FIG. 1, the digital video apparatus 100 comprises a TV decoder 110, a microprocessor 120, and a TV encoder 130. It should be noted that the digital video apparatus 100 can further comprise other devices such as an audio I/O interface, Ethernet module, IEEE 1394 interface, USB interface, DDR control module, flash memory control module, and other interface modules.

In this embodiment, the digital video 100 is coupled to an audiovisual data source 140 (for example, an audiovisual bit stream or a TV signal) via a TV decoder 110. The TV decoder 110 is used for receiving and decoding a video signal from the audiovisual data source 140. For example, a TV decoder 110 can be used for receiving an analog NTSC, PAL and/or SECAM baseband video signal, and for decoding to a YUV 4:2:2 digital video signal; in this embodiment, the TV decoder 110 comprises four ten-bit ADCs, and comprises 2D and 3D comb filters to perform YC separation. The microprocessor 120 is coupled to a TV decoder 110, a TV encoder 130 and a high capacity data storage device such as a hard disk 160. The microprocessor 120 is used for processing the video signal decoded by the TV decoder 110, accessing the hard disk 160, thereby transmitting the processed video signal to the TV encoder 130. In this embodiment, the microprocessor 120 consists of at least one digital signal processing circuit and/or a micro processing circuit (such as MIPS). The TV encoder 130, which is coupled to the microprocessor 120 and to a displaying apparatus 150 (for example, a displaying screen of a TV or a monitor), is used for encoding the video signal processed by the microprocessor 120. For example, the TV encoder encodes a digital CR-Y-CB 4:2:2 video signal into standard TV signals such as NTSC, PAL CVBS, S-Video, YUV or RGB. In this embodiment, the TV encoder 130 comprises six 12-bit ADCs.

Figure 2:
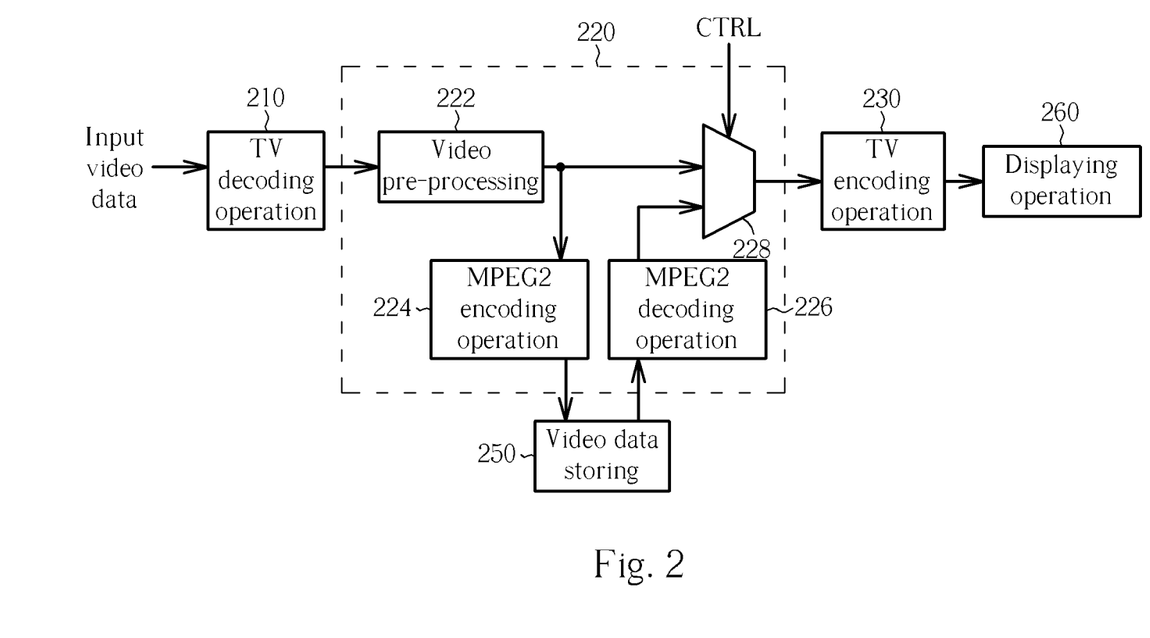
FIG. 2 is a diagram illustrating the processing path of the digital video apparatus shown in FIG. 1 displaying received video data according to one embodiment of the present invention.

FIG. 2 is a diagram illustrating the processing path of the digital video apparatus 100 displaying received video data according to one embodiment of the present invention. In the figure, each block indicates the process or operation of the device shown in FIG. 1, which will be described below. After the digital video apparatus 100 receives a digital signal from the audiovisual data source 140, the TV decoder 110 first performs the TV decoding operation 210 previously described. After the TV decoding operation 210 is finished, the TV decoder 110 transmits the decoded video signal to the microprocessor 120, which performs video pre-processing 222 to the signal. Normally, the pre-processing performs a filtering operation and/or other image processing operations to decrease or eliminate noise introduced during transmission. After pre-processing, the video signal enters two different processing paths. In the first path, the pre-processed video signal is directly transmitted to the TV encoder 130 to perform a TV encoding operation 230, as described above, and the encoded video signal is transmitted to the displaying apparatus 150 for displaying operation 260. In the second path, the pre-processed video signal is processed by the microprocessor 224 for MPEG2 encoding or some other data compression to compress the data for storing on the hard disk 160 (that is, the video data storage operation 250). The stored data (in compressed form) will be read as required, and the microprocessor 120 performs a MPEG2 decoding operation 226 to return it to an uncompressed video signal. Then the decompressed video signal undergoes TV encoding operation 230 and displaying operation 260 for displaying.

It should be noted that the microprocessor 120 also adds a timestamp to the stored video signal during compression (in the second described path), thereby allowing the digital video apparatus 100 to identify the image timing accurately. The technique for adding timestamps to a video signal is well-known by persons skilled in the art, thus it is omitted for brevity.

As described above, the embodiment of the present invention does not utilize the prior art processing method, which reads stored video data and displays it, and causes an apparent time delay even more than several seconds while watching live content. The embodiment of the present invention provides a video signal processing path (i.e. the first path as described above) that can directly output the video signal and display without going through the steps of compressing/encoding, writing to storage, retrieving from storage, and decompressing/decoding; the user can watch "true real-time" video content, and does not need to suffer extra delays. Such a feature is especially meaningful for the user who has high demand for real-time video (for example, sports games or premiere movie showings).

The user may want to watch real-time content, but may also want to pause, replay, and/or rewind or seek through the displayed content. Thus, the embodiment of the present invention also provides a second path for compressing and storing the video signal after pre-processing besides the first path for real-time displaying. For example, if a user does not wish to lose video content while pausing real-time video (for example, pressing the "pause" button), he or she can give the digital video apparatus a suitable order (for example, pressing the "play" button). Simultaneously the microprocessor 120 generates a corresponding control signal CTRL, to select the video signal (via a multiplexer 228 in this embodiment) from the hard disk 160 and, after being MPEG2 decoded, thereby displays the content immediately following the paused position in the video content. Similarly, if a user wants to rewind or search past content, she/he can perform a suitable operation to the digital image apparatus (such as pressing the "rewind" button or manipulating the jog/shuttle controller). The microprocessor 120 generates a corresponding control signal CTRL to select the video signal (via a multiplexer 228 in this embodiment) from the hard disk 160 and, after being MPEG2 decoded, and displays the video content corresponding to the timing position set by the user.

Of course, the user can return to real-time video content by performing specific operation to the video system (for example, pressing the "live" button). The microprocessor 120 generates a corresponding control signal CTRL to select the video signal after the pre-processing 222, which has not been compressed and stored, such that real-time video content will be displayed again.

It should be noted that, although the TV decoding operation 210 and the TV encoding operation 230 are performed via a dedicated TV decoder circuit and a TV encoder circuit, this embodiment is for illustrative purposes and is not intended to be a limitation of the present invention. Similarly, while the video pre-processing 222, the MPEG2 encoding operation and the MPEG2 decoding operation are performed by a microprocessor 120 co-operated with software or firmware, this is not intended to be a limitation of the present invention. As known by persons skilled in the art, the above-mentioned processing operations and functions can be performed by other circuits and/or software. Besides, in this embodiment, the digital video apparatus 100 comprises a TV decoder 110 for transforming an analog video signal to a digital video signal, and a TV encoder 130 for transforming the digital video signal to the analog video signal, but it is not intended to be a limitation of the present invention; the TV decoder 110 can be removed if the signal from audiovisual data source 140 is originally in digital form, and the TV encoder 130 can be removed if the displaying apparatus 150 includes a digital signal interface for receiving the digital video signal. Also, the hard disk 160 may be a storage medium that is dependent on or independent from the digital video apparatus 100, but it is not intended to be a limitation of the present invention. For example, a remote apparatus that can be connected via a network (such as the Internet) should also fall within the scope of the present invention. In addition, the digital video apparatus 100 performs video compression before storing the video signal to save bandwidth or storage space in this embodiment, but this is also not intended to limit the scope of the present invention. In other embodiments, the video signal can be directly stored to the hard disk 160 without compression.

Figure 3:
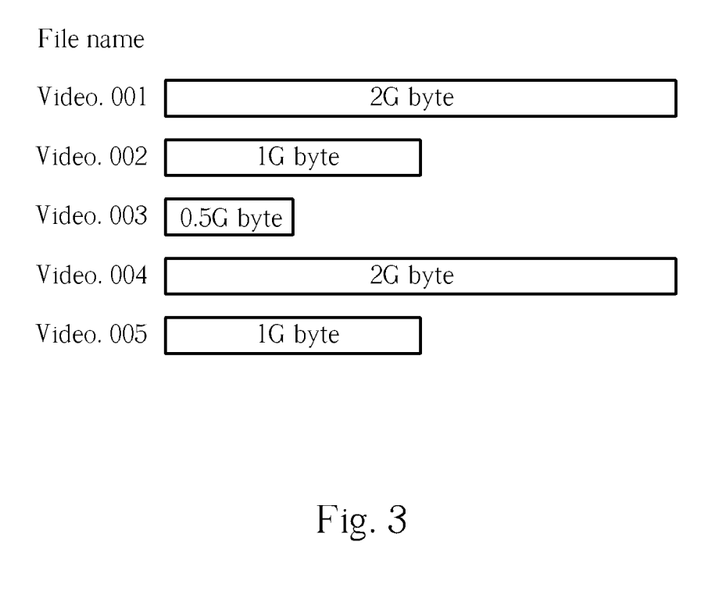
FIG. 3 is a diagram illustrating a plurality of video files of the same content.

FIG. 3 is a diagram illustrating a plurality of video files of the same content (for example, the same movie). The image files are stored in the hard disk 160 of the digital video apparatus 100 or received via the Internet or other data sources. As shown in FIG. 3, the video information of the same content is stored to five files in this sequence: "video.001" with 2 G byte, "video.002" with 1 G byte, "video.003" with 0.5 G byte, "video.004" with 2 G byte, "video.005" with 1 G byte. The timing of information stored in the "video.002" follows the timing of the "video.001", the timing of information stored in the "video.003" follows the timing of the "video.002", and so on. Since the size of each single file may be limited by the encoding technique (as in DivX, for example) or by the file system (like FAT32, for example), the video information must be separated into several files. The video information may be separated into a plurality of files when being received from a data source (for example, data transmission over the Internet), or it can be separated when the microprocessor 120 compresses and encodes the video data.

Figure 4:
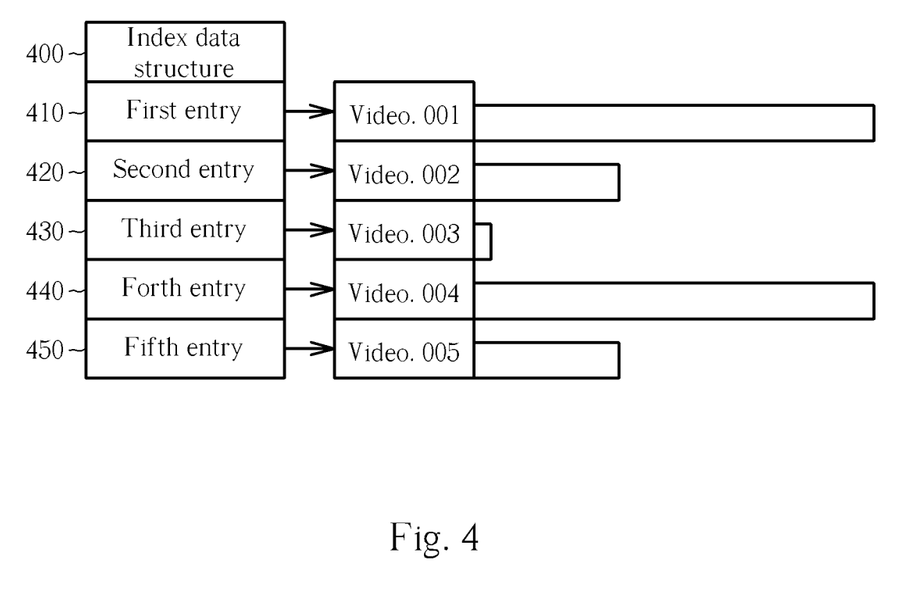
FIG. 4 is a diagram illustrating the corresponding relations between the index data structure and video files according to one embodiment of the present invention.
Figure 5:
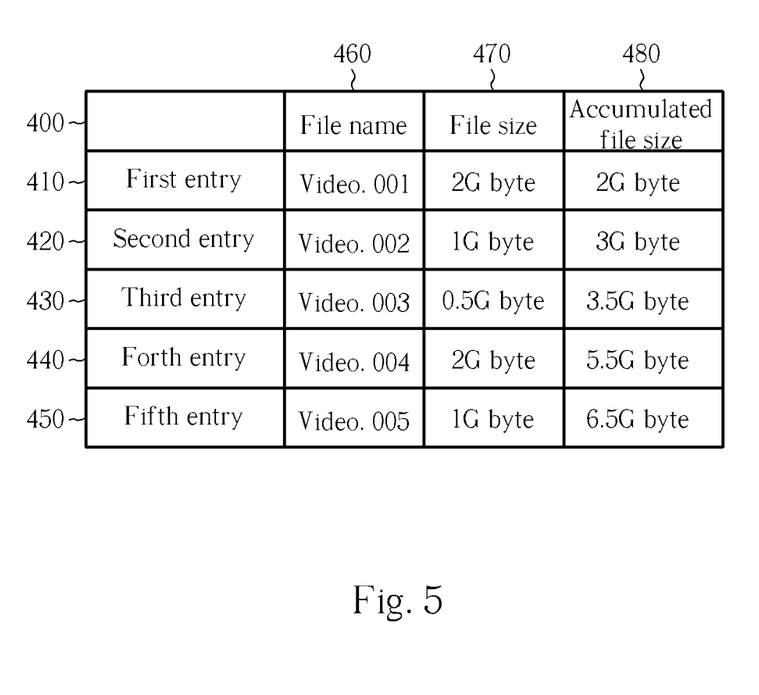
FIG. 5 is a diagram illustrating the content of the index data structure shown in FIG. 4 according to one embodiment of the present invention.

According to the embodiment of the present invention, when the digital video apparatus 100 forms the above-mentioned video files belonging to the same content, the digital video apparatus 100 stores the video files to the hard disk 160, but also generates an index file for the video files, as shown in FIG. 4. FIG. 4 is a diagram illustrating the corresponding relations between the index data structure 400 and above-mentioned video file according to one embodiment of the present invention. As shown in FIG. 4, the index data structure 400 includes a plurality of entries, and each of the entries corresponds to one of the above-mentioned video files. For example, the first entry 410 corresponds to "video.001", the second entry 420 to "video.002", and so on. FIG. 5 is a diagram illustrating the content of the index data structure 400 shown in FIG. 4 according to one embodiment of the present invention. Corresponding to each entry, the index data structure 400 comprises a "file name" field 460, a "file size" field 470, and selectively comprises an "accumulated file size" field 480.

The "file name" field 460 is used to indicate the file names of each file according to the timing order of the video data content. For example, as shown in FIG. 5, the "file name" field of the first entry is "video.001", the "file name" field of the second entry is "video.002", and the "file name" field of the fifth entry is "video.005". The "file size" field 470 is used for indicating the file size of the file names corresponding to each entry. As shown in FIG. 5, the "file size" field of the first entry is 2 G byte; that is, the size of "video.001" is 2 G byte. Also, the "file size" field of the second entry is 1 G byte; that is, the size of "video.002" is 1 G byte. Similarly, the "file size" field of the fifth entry is 1 G byte; that is, the size of "video.005" is 1 G byte. The "accumulated file size" field 480 is used for indicating accumulated file size since the first entry. For example, as shown in FIG. 5, the "accumulated file size" fields 480 of the first through fifth entries are 2 G byte, 3 G byte, 3.5 G byte, 5.5 G byte, 6.5 G byte, respectively.

In this embodiment, the digital video apparatus 100 will search for the stored image files at certain instances; for example, when initializing or opening specific file directories. Also, the digital video apparatus 100 finds files with the same file characteristics (for example, files with "video" heading in this embodiment), fills the index data structure 400 with related file information, and buffers the index data structure 400 to a memory space (for example, a DRAM, which is not shown in the figures). It should be noted that the disclosed method for generating and maintaining an index file is only an example and is not intended to be a limitation of the scope of the present invention. Persons skilled in the art can use other methods for generating or maintaining an index file, which also falls within the scope of the present invention; for example, the index data structure 400 can be stored in a type of file. Furthermore, the index data structure 400 can comprise not only the above-mentioned field information, but also information about the type of received signal (for example, NTSC or PAL), video bit rate, or video length (for example, expressed in time or number of frames) for determining current playback position.

Figure 6:
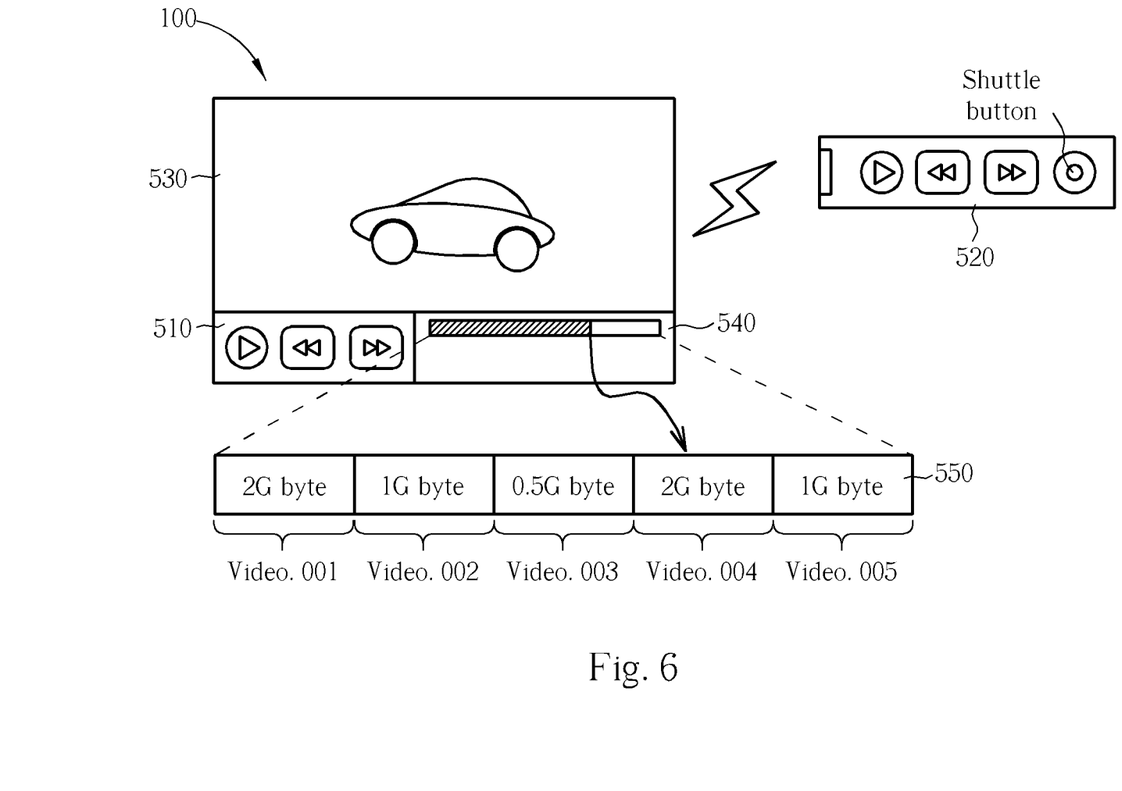
FIG. 6 is a diagram illustrating the corresponding relations between the video content displayed by the digital video apparatus shown in FIG. 1 and the video files according to one embodiment of the present invention.

Since the digital video apparatus 100 can generate and maintain the index data structure 400 as shown in FIG. 5, the digital video apparatus 100 can easily find where the current displayed image is located and which image file is being accessed by reading the information stored in the index data structure 400 and computing index, then by accessing the memory location of the indicated file to correctly display the video content. FIG. 6 is a diagram illustrating the corresponding relations between the video content displayed by the digital video apparatus 100 and the image files according to one embodiment of the present invention. As shown in FIG. 6, the digital video apparatus 100 comprises an operation interface 510, a remote operation interface 520, and a displaying screen 530. In this embodiment, the operation interface 510 comprises popular operation functions for controlling video playback: buttons for "play", "rewind", "fast forward", or other functions, for example. The remote operation interface 520 (for example, a remote controller) can comprise above-mentioned operation buttons, but can also comprise a jog/shuttle controller for quickly searching desired video content.

In FIG. 6, a slider or time bar 540 is further included, which can be dragged for determining the position of the video content to be displayed. The time bar 540 can be a part of the operation interface of the digital video apparatus 100, but the time bar 540 can be omitted from the operation interface and simply indicate the time index to show the current position of video content.

When the video content is normally displayed (for example, a user pushes the play button), the digital video apparatus 100 maintains a time counting value for indicating the timing position of the video content currently displayed. The video content can be displayed in sequence via increasing the time counting value. As shown in FIG. 6, there is a one-to-one corresponding relation between the time bar 540 for time indicator and the content index 550 indicating the file locations. Since there is a corresponding relation between the position of the video content and the storage location of the video files, the time counting value maintained by the digital video apparatus 100 can be transformed to the corresponding data location. Then a search-and-compare step is performed via the index data structure 400 shown in FIG. 5, such that the location of the video currently displayed content can be obtained.

For example, the displayed video position is at one hour twenty-five minutes when the user pushes the play button. The data location corresponding to the current position is between (2 Gbyte+1 Gbyte+0.5 Gbyte)=3.5 Gbyte and (2 Gbyte+1 Gbyte+0.5 Gbyte+2 Gbyte)=5.5 Gbyte. That is, the current position in file "video.004", which can be obtained by transforming the timing/data amount and searching and comparing against the index data structure 400 (for example, comparing and searching the "file size" field 470). The precise location of the data in file "video.004" can be obtained via a transforming equation or ratio relation. In this way, the digital video apparatus 100 can correctly access the video data in "video.004" and display it. Alternatively, the method can directly search or compare the ""accumulated file size" field 480. Similarly, if the playback position enters the data location of the next file (for example, two hours ten minutes into the video), the data location corresponding to that current timing in the file "video.005" can be obtained by transforming the timing/data amount and searching and comparing against the index data structure 400, and the digital video apparatus 100 can correctly access the video data in "video.005" and display it.

The advantage of the present invention is more apparent when the displayed video content is rewound or searched, especially for rewinding or searching across files. For example, when the rewind button is pressed, or when the user is operating the jog/shuttle controller on the remote control interface 520. In the previous example, the displayed position is at one hour twenty-five minutes of video, and the corresponding data location is in file "video.004". In this case, if the playback position is changed to one hour five minutes into the video via a rewinding or searching operation, the data location corresponding to the current timing in the file "video.003" can be obtained by transforming the timing/data amount and searching and comparing against the index data structure 400, and the digital video apparatus 100 can correctly access the video data in the "video.003" to display it. It should be noted that, the digital video apparatus 100 originally reads data from the file "video.004" and then reads data from the file "video.003"in the rewinding or searching operation of the embodiment; such a cross-file operation, especially a backward cross-file operation, cannot be performed by prior art. However, such an operation can be easily accomplished with the index data structure according to the embodiment of the present invention, co-operated with some simple file content searching and comparing operations.

It should be noted that, although the index data structure 400 is used for storing the file size or the accumulated file size in above-mentioned embodiment, it is not intended to be a limitation of the present invention. As known by persons skilled in the art, the index data structure 400 also can store time stamps corresponding the starting or ending times of the file content, and the same effect can also be reached this way. Besides, since each entry arranges the data according to file names and file sizes (or time stamp), the file names for video files of the same content (for example, a movie) stored in the digital video apparatus 100 utilizing the index data structure 400 of the present invention do not need any specific stoke or word numbers. The digital video apparatus 100 need only to search the index data structure 400 to find the correct video files.

As mentioned above, the embodiment according to the present invention discloses a digital video apparatus generating and maintaining an index data structure with small size, such that seamless cross-file video searching and display can be obtained. By this way, the problems of prior art can be avoided, where the user must suffer stops or delays when displaying across files, and where backward seeking or displaying across files cannot be performed at all. The software applied to the digital video apparatus utilizing the index data structure of the present invention can be designed to only manage and show the index data structure, thereby allowing the user to see only the information in a content-based form instead of a file-based form. Thereby the interface management of the application software can be simpler and friendlier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital recording apparatus, comprising:
   a storage device;
   a processing circuit, coupled to the storage device, for receiving a video signal and storing the video signal to the storage device in the form of a plurality of video files, and for generating an index data structure comprising a plurality of entries corresponding to the video files respectively, wherein the index data structure corresponds to a same program content; and
   a displaying device, coupled to the processing circuit, for displaying a video concept of the video files;
   wherein the processing circuit searches and compares accumulated file size values in the index data structure according to a time counting value when displaying the video concept to determine a first video file to be read of the video files and a first location of the first video file.

2. The digital recording apparatus of claim 1, further comprising a decoding circuit, coupled to the processing circuit, for performing an analog to digital conversion on the received video signal.

3. The digital recording apparatus of claim 1, further comprising an encoding circuit, coupled between the processing circuit and the displaying device, for performing a digital to analog conversion on the video signal corresponding to the video files stored in the storage device.

4. The digital recording apparatus of claim 1, wherein the processing circuit further performs a de-compression operation on the video files read from the storage device.

5. The digital recording apparatus of claim 1, wherein the index data structure comprises file names of the video files.

6. The digital recording apparatus of claim 1, wherein the index data structure comprises file sizes of the video files.

7. The digital recording apparatus of claim 1, wherein the plurality of video files have different files sizes.

8. The digital recording apparatus of claim 1, wherein the plurality of video files are encoded according to different audiovisual encoding techniques.

9. The digital recording apparatus of claim 1, wherein the accumulated file size value of an entry in the index data structure corresponds to a file size of the entry and all preceding entries in the index data structure.

10. The digital recording apparatus of claim 1, wherein the accumulated file size value of an entry in the index data structure corresponds to an accumulated file size of the entry and all preceding entries in the index data structure.

11. A digital video system, comprising:
a storage device for storing a plurality of video files corresponding to a received video signal;
a first logic, coupled to the storage device, for maintaining an index data structure comprising a plurality of entries corresponding to the plurality of video files respectively, wherein the index data structure corresponds to a same program content; and
a displaying device, coupled to the first logic, for receiving and displaying a video concept of the video files from the first logic;
wherein the first logic searches and compares accumulated file size values in the index data structure according to a time counting value when displaying the video concept to determine a first video file to be read of the video files and a first location of the first video file.

12. The digital video system of claim 11, further comprising a decoding circuit, coupled to the first logic, for performing an analog to digital conversion on the received video signal.

13. The digital video system of claim 11, further comprising an encoding circuit, coupled between the first logic and the displaying device, for performing a digital to analog conversion on the video signal corresponding to the video files stored in the storage device.

14. The digital video system of claim 11, wherein the first logic further performs a de-compression operation on the video files read from the storage device.

15. The digital video system of claim 11, wherein the index data structure comprises file names of the video files.

16. The digital video system of claim 11, wherein the index data structure comprises file sizes of the video files.

17. The digital video system of claim 11, wherein the storage device is a remote device coupled to the first logic via a network.

18. A video displaying method, comprising:
generating an index data structure comprising a plurality of entries corresponding to a plurality of video files respectively, wherein the plurality of video files correspond to a same program content;
maintaining a time counting value corresponding to a video concept to be displayed;
searching and comparing accumulated file size values in the index data structure according to the time counting value to determine a first video file to be read of the video files and a first location of the first video file; and
reading the first location of the first video file in order to display the video concept.

19. The video displaying method of claim 18, wherein the index data structure comprises file names of the video files.

20. The video displaying method of claim 18, wherein the index data structure comprises file sizes of the video files.

21. The video displaying method of claim 20, further comprising comparing a data location corresponding to the time counting value and the file sizes stored in the index data structure to determine the first video file and the first location thereof.

22. The video displaying method of claim 18, further comprising:
providing an application software; and displaying the index data structure in an operation interface of the application software.

* * * * *